United States Patent [19]

Girard

[11] Patent Number: 4,597,140

[45] Date of Patent: Jul. 1, 1986

[54] TUBE CLAMP

[75] Inventor: Donald A. Girard, Rancho Cordova, Calif.

[73] Assignee: Girard Development Incorporated, Rancho Cordova, Calif.

[21] Appl. No.: 521,139

[22] Filed: Aug. 8, 1983

[51] Int. Cl.$^4$ .................. A44B 21/00; F16G 11/06
[52] U.S. Cl. .................. 24/569; 24/135 R; 24/525; 403/391
[58] Field of Search .............. 24/135 R, 569, 576, 24/525, 522, 535, 132 R, 132 WL, 134 R, 326; 248/74.1, 74.4; 403/12, 13, 391

[56] References Cited

U.S. PATENT DOCUMENTS

| 1,259,597 | 3/1918 | Breen | 24/135 R |
| 1,943,020 | 1/1934 | Johnson | 24/135 R |
| 1,964,511 | 6/1934 | Grover | 403/391 |
| 2,422,332 | 6/1947 | Becker | 24/135 R |
| 2,452,406 | 10/1948 | Volkery et al. | 24/569 |
| 2,582,384 | 1/1952 | Knollman | 24/326 |
| 2,592,791 | 4/1952 | Coberly | 24/569 |
| 2,621,384 | 12/1952 | Slaughter | 24/569 |
| 2,674,772 | 4/1954 | Jacobs | 24/525 |
| 4,302,124 | 11/1981 | Wilks et al. | 403/391 |
| 4,411,331 | 10/1983 | Hanada | 403/12 |

FOREIGN PATENT DOCUMENTS

| 16120 | of 1929 | Australia | 24/135 R |
| 21339 | of 1915 | United Kingdom | 24/135 R |

Primary Examiner—Victor N. Sakran
Attorney, Agent, or Firm—Owen, Wickersham & Erickson

[57] ABSTRACT

A tube clamp includes a pair of clamping members. One of the members is adapted to be fixedly secured as by welding to a stationary surface and the other bolted to the fixed member. The fixed member is formed with recesses complementarily formed relative to the heads of bolts used to clamp the two members together thus providing captive bolts.

Interengaging elements on the members prevent clamping the two members together except when the members are in a fixed relationship.

2 Claims, 4 Drawing Figures s
TUBE CLAMP

BACKGROUND OF THE INVENTION

The present invention relates to tube clamps of the general type disclosed in U.S. patent application Ser. No. 096,809 filed Nov. 23, 1979. In said application a pair of clamping members are described which are adapted to be bolted together and to a fixed structure.

In some instances it is desirable to be able to fixedly secure one of the clamping members to a structure which does not permit securement by bolting. In such a case the clamping forces could be applied by providing a tapped hole in the fixed member to permit a bolt to be passed through the other member and into the tapped hole. However such a procedure is not desirable since tapped holes are not as reliable as bolts and nuts. Furthermore additional precautions, such as safety wiring, would be required in many cases to prevent the bolts from backing off. By the present invention a simple structure is provided permitting the use of bolts and nuts.

SUMMARY OF THE INVENTION

The main object of the present invention is the provision of a tube clamp of the type disclosed in the above noted application and which clamp permits the securement of the clamp to a fixed structure which does not lend itself to securement to such such structure by bolting.

Another object is the provision of a tube clamp which consists of two identical clamping members thereby minimizing the cost of manufacture.

Still another object is the provision of a tube clamp in which the two clamping members are formed to prevent them from being secured together except in a predetermined correct orientation.

Other objects and advantages will be apparent from the following specification and drawings.

Figure 1:
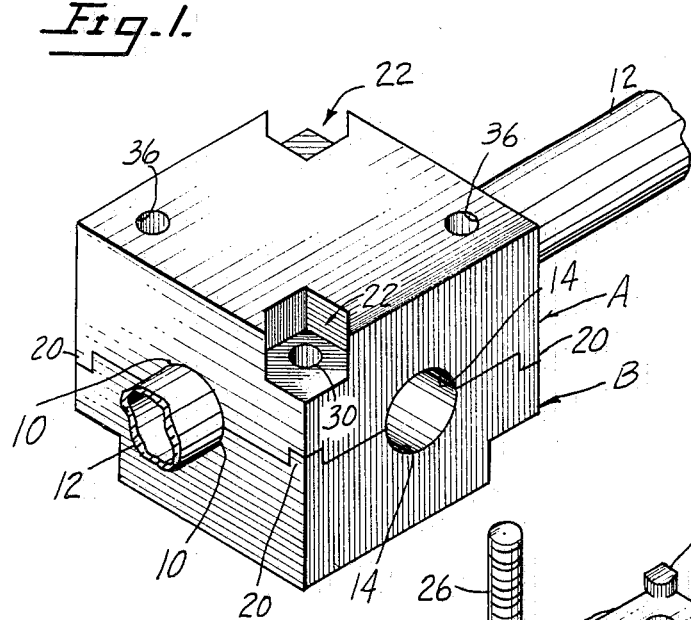
FIG. 1 is an isometric of the preferred form of tube clamp without the clamping bolts.

Referring first to FIG. 1 the preferred form of the invention comprises a pair of identical clamping members A,B. Although said members are shown as square, the invention is not restricted to such a shape.

Each member A,B is formed with a generally semicircular groove 10 which cooperates with an identical groove 10 in the other member to provide a cylindrical through opening for receiving a tube therethrough, such as tube 12 indicated in FIG. 1.

Another groove 14 is provided in intersecting relation to groove 10 so that two grooves 14 cooperate as a pair to receive therein a different tube.

As can be seen in FIG. 1 the grooves 10 and 14 may be employed alternatively to secure tubes of different sizes with the one clamp. Another use for the clamp is to hold the same size tube but in different ways. For example the grooves 10 may be exact semicircles for holding a tube in place against lateral movement, and grooves 14 may be of slightly less depth as indicated in FIG. 1 for gripping the sidewalls of the tube and preventing longitudinal as well as lateral movement.

In view of the above noted uses it is important that clamp members A,B be assembled with the tube receiving grooves cooperating as pairs in the manner above described. To this end the members A,B are formed at opposite diagonal corners of their engaging faces with recesses 18 which are adapted to receive therein corresponding projections 20 on the other member. By this structure it is not possible to clamp members A,B together in face to face relation unless grooves 10 cooperate as a pair and grooves 14 cooperate as another pair.

Adjacent a pair of opposite diagonal corners of the outer face of each clamping member the same is formed with a recess 22 which is complementarily formed relative to the head of the bolt to be used. For example, a bolt head which may be fitted into one of the recesses 22 is shown in dotted lines at 24 in FIG. 3.

At recesses 22 each clamp member is formed with holes 30 through which the shanks of bolts 26 may be passed.

Figure 2:
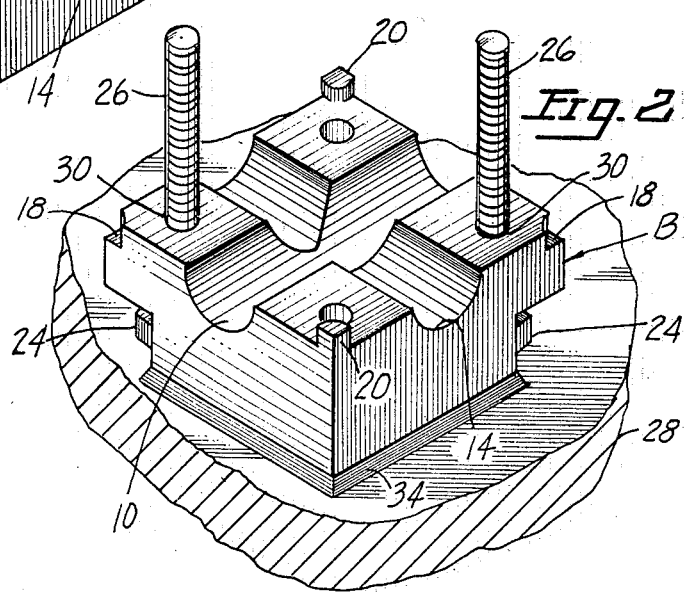
FIG. 2 is an isometric of the lower clamping member of FIG. 1.
Figure 3:
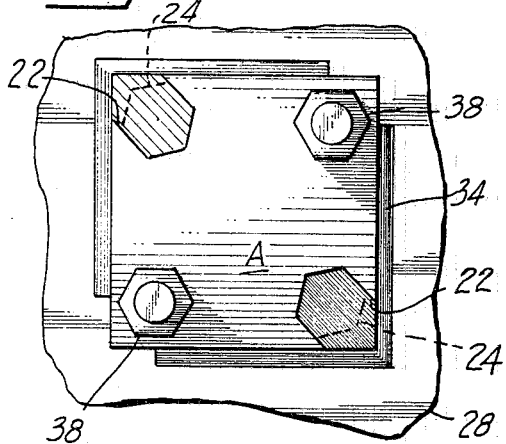
FIG. 3 is a top plan view of the clamp of FIG. 1 showing the clamping bolts and nuts.
Figure 4:
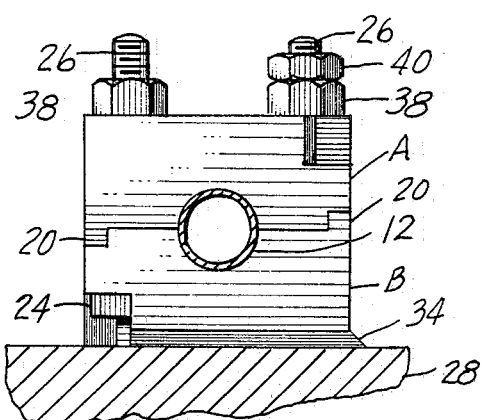
FIG. 4 is a side elevation of the clamp of FIG. 3.

As best seen in FIG. 2, a pair of bolts 26 are shown supported by their heads 24 on a heavy metal structure 28, a portion of which is also shown in FIGS. 3 and 4. Assuming it is desired to secure the tube clamp and its tube to the structure 28 the lower member of the tube clamp is placed in the desired position with the bolts 26 projecting upwardly and with the bolt heads 24 fitted within recesses 22. The lower clamping member B is then welded to the structure 28 along as much of the outer periphery of member B as is desired. Said welding being indicated at 34.

The upper clamping member A is formed with a pair of holes 36 which are adapted to receive the shanks of bolts 26 therethrough with the clamp oriented as seen in FIG. 1. Nuts 38 may then be threaded onto bolts 26 and the assembly tightened to the position seen in FIG. 4. If desired, lock nuts 40 may also be applied to bolts 26 to prevent the nuts from backing off.

As noted above the grooves 12,14 may be employed as pairs alternatively, either to clamp tubes of different sizes or to clamp tubes of the same diameter but in a different manner. Thus as best seen in FIG. 1 grooves 14 are less deep than grooves 10 and are adapted to grip the same tube as grooves 10 so as to prevent longitudinal as well as lateral movement of the tube. This has been found to be a valuable use for the invention.

I claim:

1. A tube clamp affording two alternate passages for a tube to extend therethrough, comprising:
    a pair of identical, tube-engaging, square blocks adapted to be secured together with inner faces in contact with each other and with an outer generally flat face and flat side walls, on each said block,
    a pair of bolts for clamping said members together,
    each said inner face being provided with a first generally semicylindrical groove, the said first grooves of the pair of blocks cooperating to provide a first generally cylindrical through opening perpendicular to two pairs of said side walls for receiving a tube therein,
    each said inner face also being provided with a second generally semicylindrical groove perpendicular to said first groove and to the other two pairs of side walls and cooperating as a pair to form a generally cylindrical second though opening for receiving a tube therein as an alternate position for said tube,
    each block having a first pair of bolt holes near the extremities of one diagonal across said outer faces and a second pair of bolt holes near the extremities of the other diagonal across said outer faces, said outer face having a bolt-head receiving recess around each of said second pair of holes, said recess having a shape complementary to the head of said bolt to prevent turning of said head when said bolt in its said hole, and interengaging elements on the inner face of each said block to prevent said securement together in face-to-face relation except when said first and second grooves cooperate as pairs, said first pair of holes of one block then being aligned with said second pair of holes of the other block, said flat surfaces of said outer faces enabling a nut to be turned on each flat surface when such nut is in threaded engagement with one of said bolts.

2. A tube clamp according to claim 1 wherein said first and second grooves are of different depths.

* * * * *